United States Patent [19]

Roberts et al.

[11] Patent Number: 5,042,052

[45] Date of Patent: Aug. 20, 1991

[54] CARRIER ACQUISITION SCHEME FOR QAM AND QPSK DATA

[75] Inventors: Richard D. Roberts; James C. Richards; James F. Roesch; Scott W. Stewart; Mark A. Webster, all of Palm Bay, Fla.

[73] Assignee: Harris Corporation, Melbourne, Fla.

[21] Appl. No.: 481,089

[22] Filed: Feb. 16, 1990

[51] Int. Cl.⁵ .............................................. H03D 3/02
[52] U.S. Cl. ........................................ 375/97; 375/82; 375/120; 375/39; 329/307
[58] Field of Search ...................... 375/39, 77, 81, 82, 375/79, 120, 102, 97; 329/304, 307, 308, 309; 331/11, 17

[56] References Cited

U.S. PATENT DOCUMENTS

| | | | |
|---|---|---|---|
| 4,262,264 | 4/1981 | Vandegraaf | 331/17 |
| 4,475,218 | 10/1984 | Takeda et al. | 375/81 |
| 4,501,002 | 2/1985 | Auchterlonie | 375/77 |
| 4,571,550 | 2/1986 | Head | 375/39 |
| 4,642,573 | 2/1987 | Noda et al. | 375/77 |
| 4,691,176 | 9/1987 | Hsiung et al. | 331/17 |
| 4,704,582 | 11/1987 | Dixon et al. | 375/81 |
| 4,757,272 | 7/1988 | Okada et al. | 375/120 |
| 4,866,739 | 9/1989 | Agazzi et al. | 375/106 |
| 4,868,513 | 9/1989 | Piercy et al. | 307/511 |
| 4,901,332 | 2/1990 | Williams et al. | 375/81 |
| 4,926,447 | 5/1990 | Corsetto et al. | 379/105.1 |

OTHER PUBLICATIONS

Universal Carrier Recovery Loop for QASK and PSK Signal Sets by LeClert and P. Van Damme, IEEE Transactions on Communications, vol. Com-31, No. 1, Jan. 1983.
Data-Aided Carrier Tracking Loops by Lindsay and Simon, IEEE Trans. on Communication Technology, vol. Com-19, No. 2, Apr. 1971.

*Primary Examiner*—Benedict V. Safourek
*Assistant Examiner*—Young Tse
*Attorney, Agent, or Firm*—John L. DeAngelis, Jr.

[57] ABSTRACT

The invention involves an apparatus for recovering the carrier signal in OPSK or QAM data. First an energy directed phase detector controls a voltage controlled oscillator so that the output signal has a phase that is within a few degrees of the carrier phase. Following this coarse acquisition, the system clock timing is recovered and established. A decision directed phase detector, using the system clock information, then controls the VCO to adjust the output signal phase to within a very small tolerance of the actual carrier phase.

9 Claims, 15 Drawing Sheets (PIOR ART)

(PIOR ART)

(PIOR ART)

QPSK

16-QAM

64-QAM

RECOVERED CLOCK FREQUENCY
TO CLOCK RECOVERY LOCK
DETECTOR 110

CARRIER ACQUISITION SCHEME FOR QAM AND QPSK DATA

This invention was made with Government support under contract number R75.006. The Government has certain rights in this invention.

FIELD OF THE INVENTION

This invention relates to a process and apparatus for recovering a carrier component of a QAM or QPSK waveform.

BACKGROUND OF THE INVENTION

As is known by those skilled in the art, digital radio involves the transmission of a digital information signal from the transmitter, where it modulates a carrier signal, through a communications channel, and finally to a receiver. In the receiver, the received signal is demodulated to remove the carrier, the clock is recovered, and then the received signal is decoded to extract the original information signal. The resultant signal after demodulation is the familiar eye pattern. But because of the bandwidth and time constant characteristics of the transmitter, the channel, and the receiver, the demodulated signal lacks the sharp, clearly defined edges that the information signal had before passing through the transmitter. That is, the transmitter, channel, and receiver have inherent filter-like characteristics that cause the pulses in the demodulated signal to bleed together and overlap. As a result, the eye pattern is distorted. The key to effective decoding is to sharpen the eye pattern and to sample the demodulated signal when the eye has its widest opening. At this time there is minimal interference from later transmitted symbols and thus the likelihood of accurate decoding (i.e., determining the value of the transmitted information signal) is maximized.

The signal space constellations for 16 QAM, 64 QAM, and QPSK are shown in FIGS. 1A, 1B, and 1C, respectively. Each of these signal space constellations is formed by sampling a continuous time domain waveform at the appropriate time. The sampling time is chosen to be that time when only a single transmitted symbol (digital value or impulse) is present at the receiver and there is no intersymbol interference from earlier transmitted values. The superposition of many segments of the received analog waveform is referred to as an eye pattern, and it is this eye pattern that is used to determine when the sampling should occur. The most appropriate sample location on the eye pattern is that instant when the eye is open widest. FIGS. 2A, 2B, and 2C illustrate eye patterns for QPSK, 16 QAM, and 64 QAM, respectively modulation waveforms.

Returning to FIG. 1, it can be seen that the signal constellation space is in two dimensions, commonly referred to as the I and Q channels of the signal. These two channels are distinguishable from each other on the RF carrier because the channels are modulated on carriers that are orthogonal to each other and of the same frequency. Specifically, the I channel is often modulated on a carrier of the form $\cos \omega_o t$) and the Q channel is modulated on a carrier of the form $\sin \omega_o t$). As is well known, these two mathematical functions are orthogonal to each other. This modulation scheme is well known and is commonly referred to as quadrature modulation. If the amplitude of the I/Q signals are also amplitude modulated, then the resultant is referred to as quadrature/amplitude modulation or QAM. The number of amplitude levels on the I and Q channel determines the type of QAM as illustrated in FIGS. 1A and 1B. Demodulation of the QAM and QPSK signals requires the demodulating oscillator to inject a heterodyning signal at the proper phase so that only one of the modulated channels is demodulated at a time. The other channel is demodulated in a similar manner by using a 90 degree phase shifted version of the first demodulating signal. This scheme is well known in the art and is illustrated in FIG. 3.

If the demodulating oscillator (the VCO local oscillator illustrated in FIG. 3) is phased properly with respect to the I and Q signals then the vector representation of the demodulated signals will be colinear with the I and Q axes as illustrated in FIG. 4A and the constellation space will be correctly situated as shown in FIG. 4B. FIG. 4C shows the vector representation when there is an oscillator phase error. Now the input signals, while still separated by 90 degrees, do not lie on the I and Q axis and the constellation space is skewed noticeably. FIG. 4E shows the resulting distortion in the I and the Q channels as determined by vector addition of the I and Q components from each of the input signals.

The prior art demodulator uses sweep-assisted acquisition on both the decision directed phase detector (which is a common type of phase detector suitable for use with 64 QAM modulation formats) and the clock phase detector in such a manner that the carrier and clock are attempting to acquire the signal at the same time. Since it is known that the clock must be acquired prior to the decision directed carrier phase detector acquiring, the usual method has been to sweep the carrier phase detector very slowly and the clock phase detector quickly, knowing that eventually the proper combination will occur and acquisition will be complete. While this method works, it is rather random in nature and therefore hard to predict exactly when the acquisition will be complete. In addition, the need to sweep the carrier phase detector slowly causes the process to take an excessive time.

SUMMARY OF THE INVENTION

The present invention overcomes these disadvantages by offering a two-level carrier recovery scheme that allows the carrier to be recovered prior to establishing the system clock via the use of an energy directed phase detector controlling a voltage controlled oscillator. The energy directed carrier phase recovery ensures that the carrier phase is close to being correct, within perhaps a few degrees. This is close enough to recover the system timing clock but not close enough to pass data at a suitable bit error rate. Thus, this first stage is a coarse acquisition scheme. After the system clock timing has been recovered and established, an improved form of carrier recovery can be utilized, called decision directed phase detection. This second level detector can resolve the carrier phase within a few tenths of a degree but needs a system clock to operate properly.

The preferred embodiment is suitable for use with either QPSK, 16 QAM, or 64 QAM. As is known by those skilled in the art, slight modifications to the basic concepts would be required to operate with each of these modulation formats.

A BRIEF DESCRIPTION OF THE DRAWINGS

The present invention can be more easily understood and the further advantages and uses thereof more readily apparent, when considered in view of the description of the preferred embodiments and the following figures in which:

FIGS. 1A, 1B, and 1C illustrate the signal constellations for the modulation formats of interest.

FIGS. 2A, 2B, and 2C illustrate the eye patterns formed by the constellations in FIG. 1;

Figure 8:
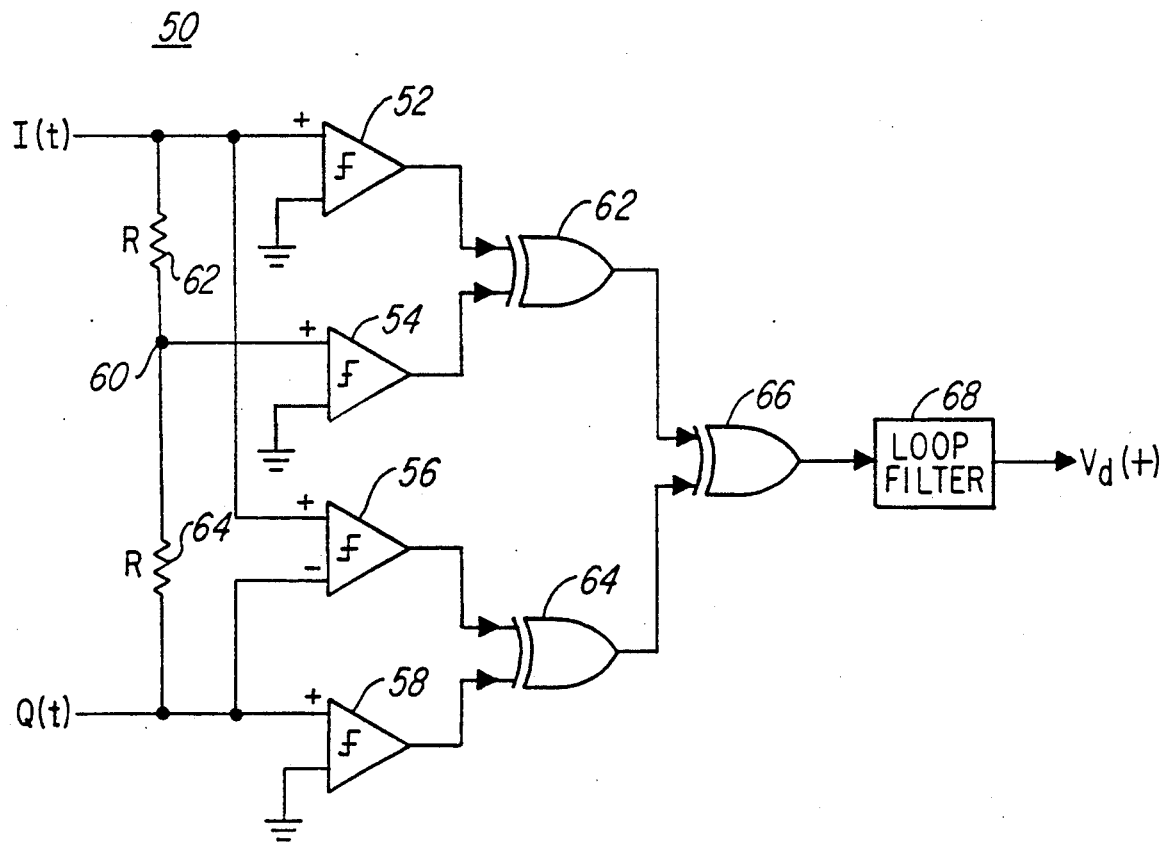
FIG. 8 illustrates a second embodiment of an energy directed phase detector constructed according to the teachings of the present invention.
Figure 10A:
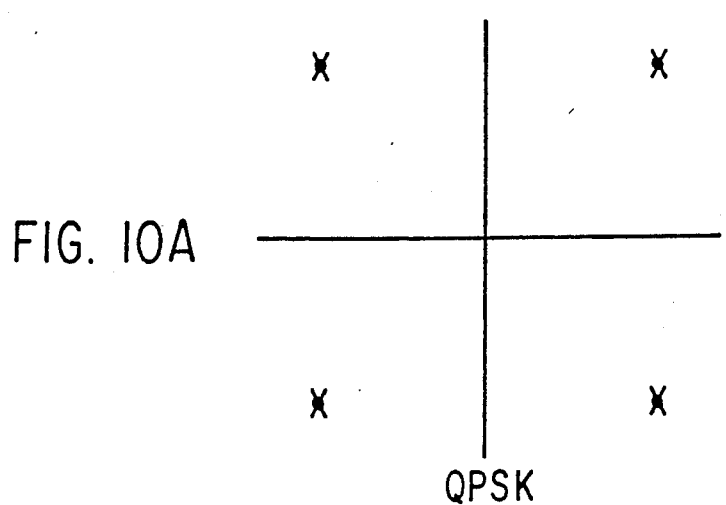
Figure 10B:
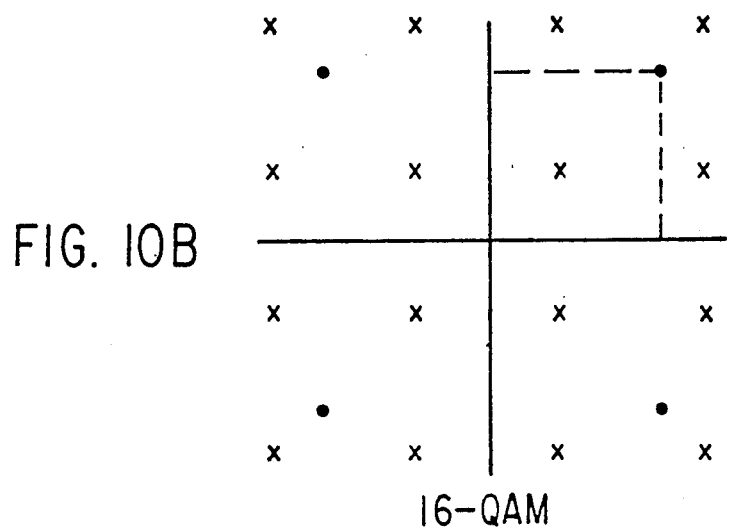
Figure 10C:
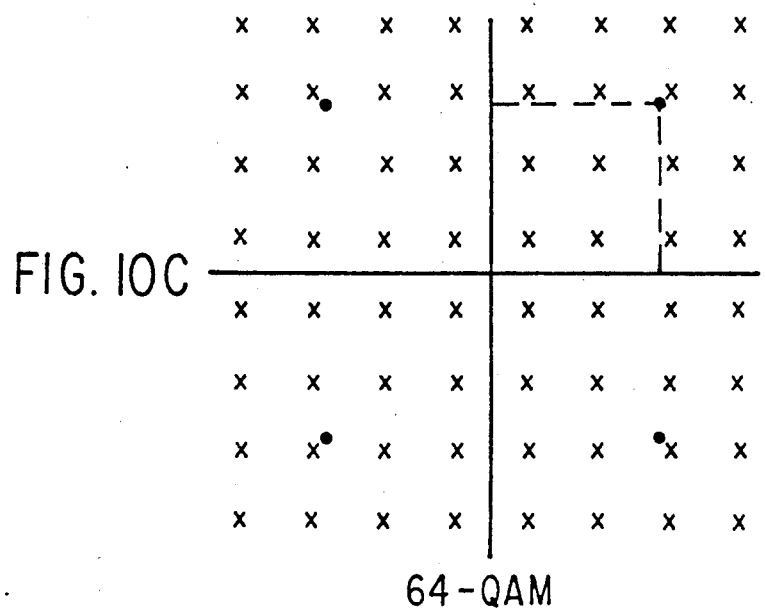
Figure 11:
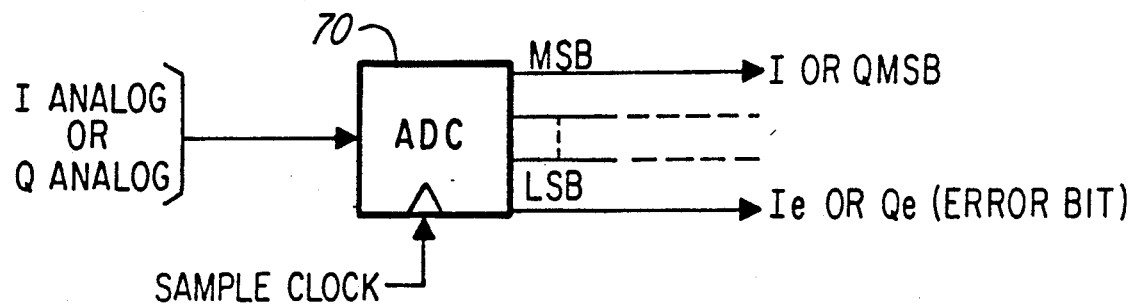
Figure 12:
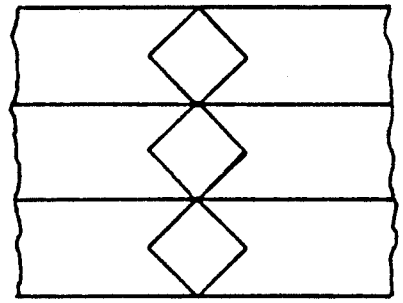
Figure 13:
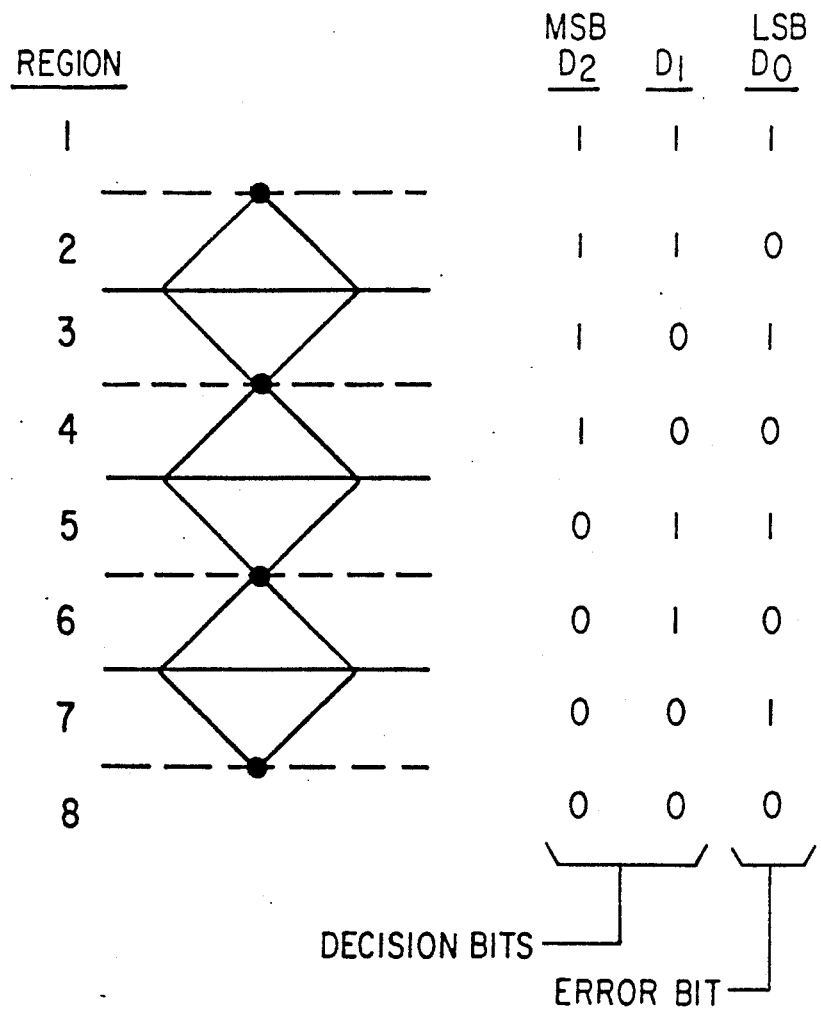
Figure 14:
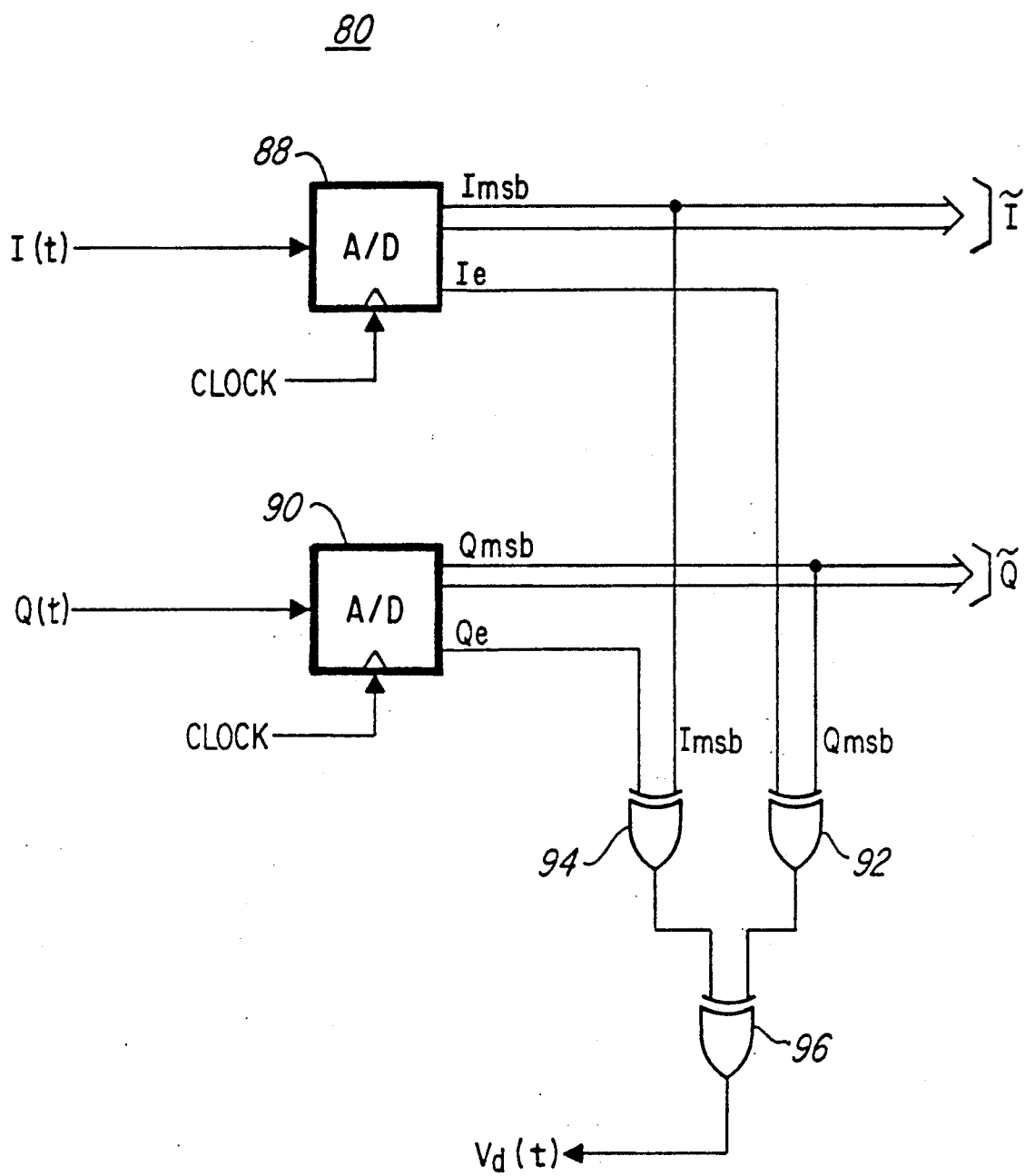
Figure 15:
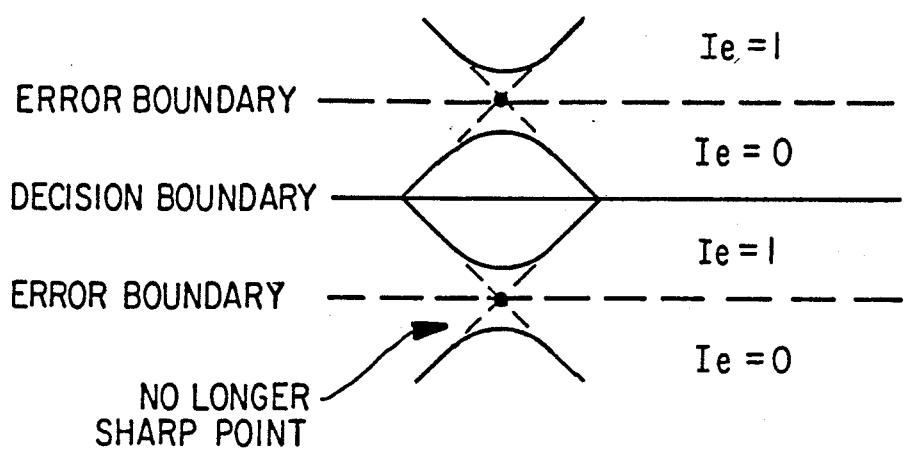
Figure 16A:
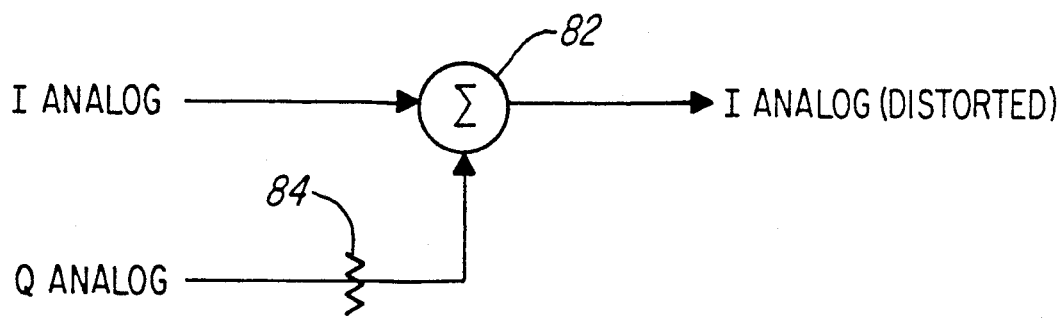
Figure 16B:
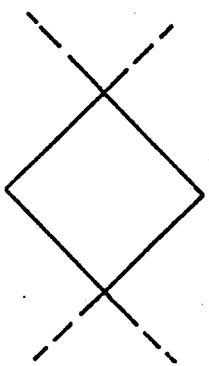
Figure 16C:
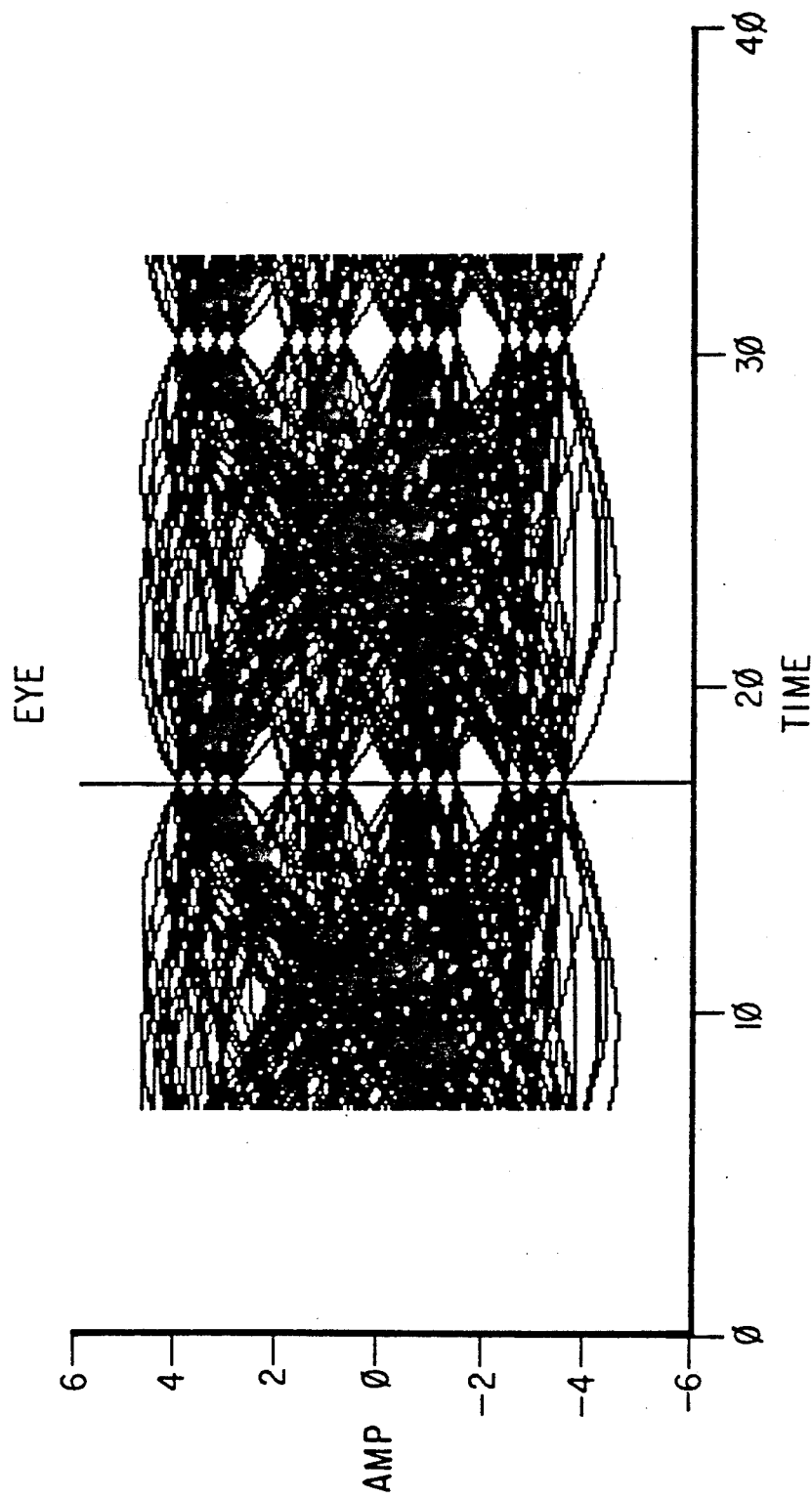
Figure 17:
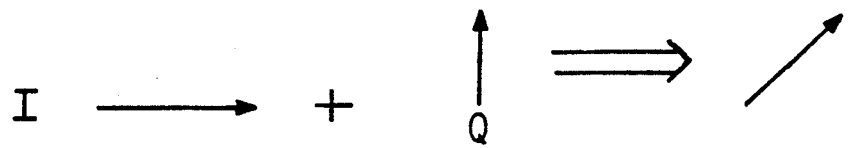
Figure 18:
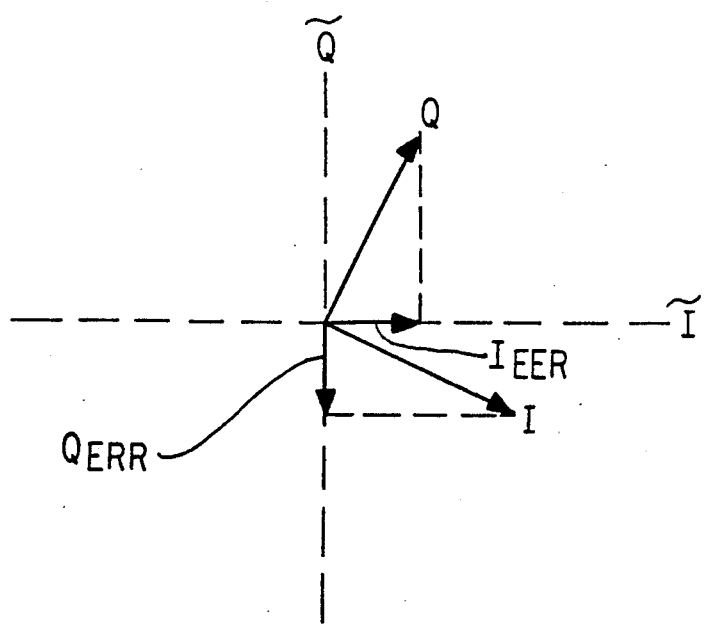
Figure 19:
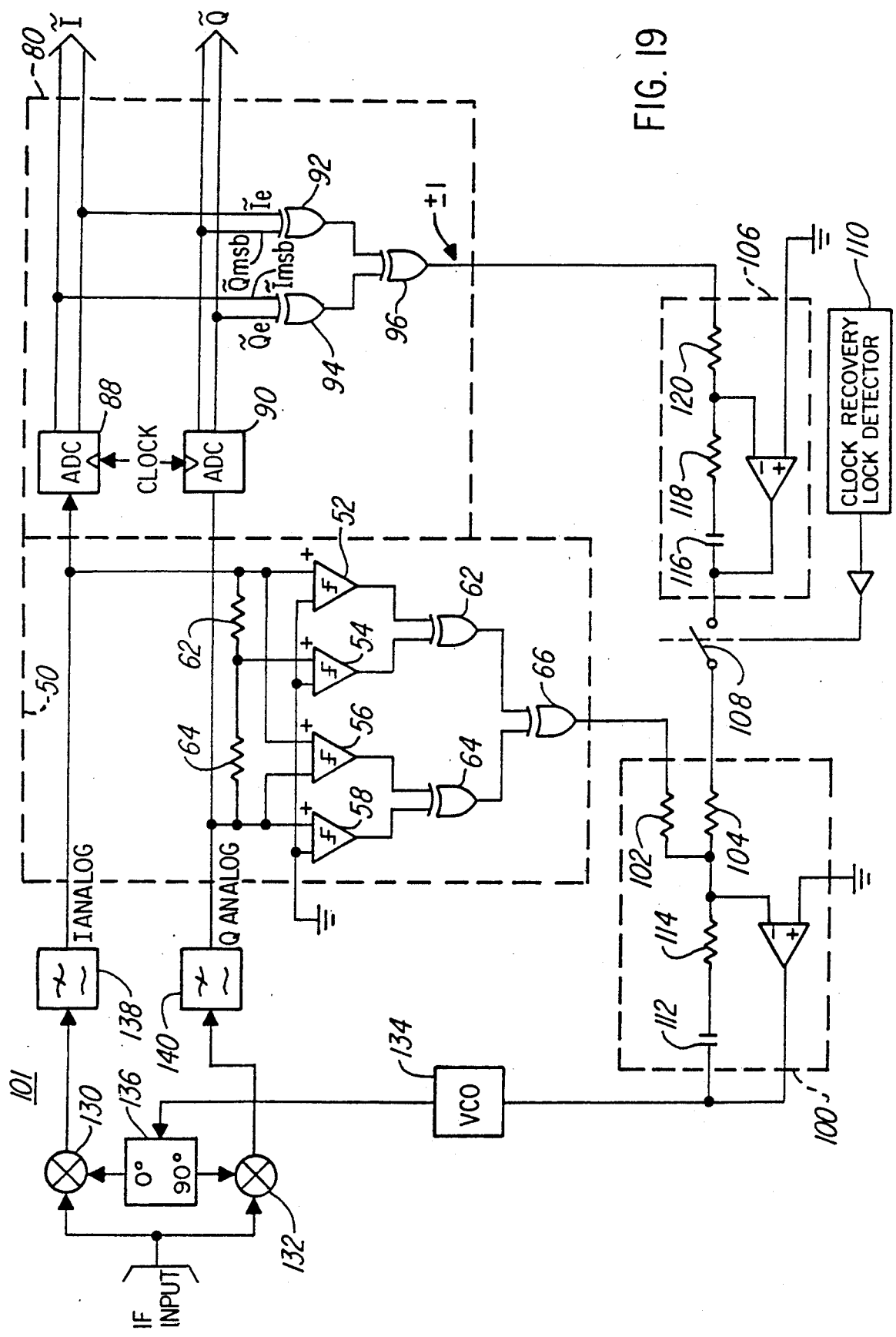
Figure 20:
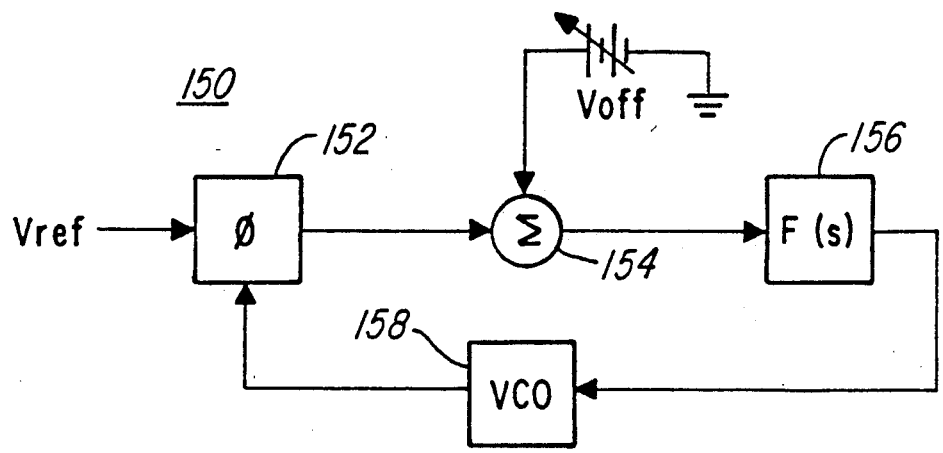

FIGS. 10A, 10B, and 10C are signal constellations;

FIG. 11 is an analog-to-digital converter used as a "slicer" or multilevel detector, FIGS. 12 and 13 are eye patterns input to the slicer of FIG. 11;

FIG. 14 illustrates a decision directed phase detector constructed according to the teachings of the present invention;

FIG. 15 illustrates a distorted eye pattern;

FIGS. 16A, 16B, and 16C illustrate distorted and undistorted eye patterns and a circuit for creating a distorted eye pattern;

FIG. 17 is a vector representation of the effects of the FIG. 16A circuit;

FIG. 18 is a vector representation of the I and Q error signals generated in the FIG. 14 phase detector;

FIG. 19 is a combination loop combining the phase detectors of FIGS. 8 and 14;

FIG. 20 illustrates a typical phase locked loop; and

Figure 21:
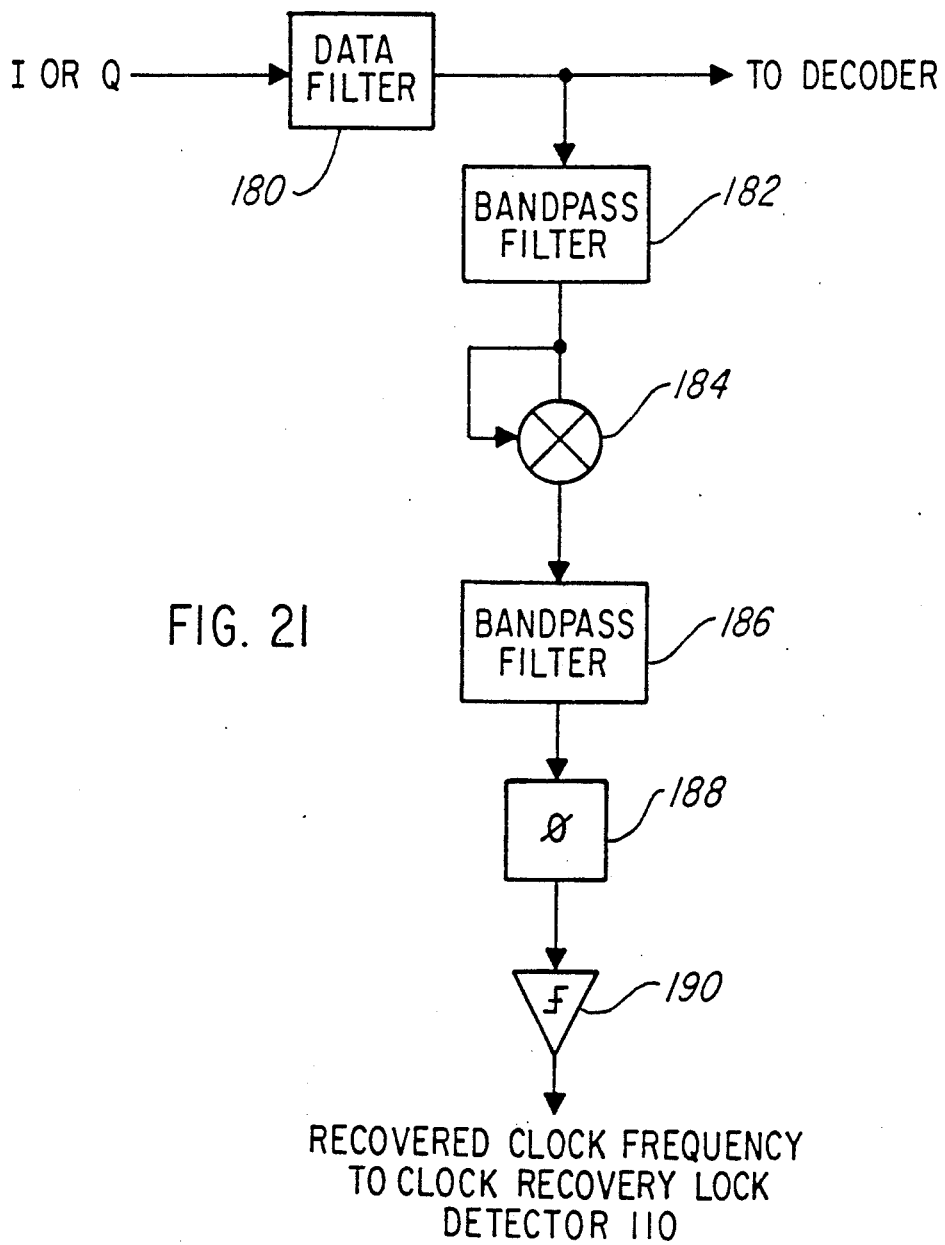

FIG. 21 is a clock recovery circuit for use in the FIG. 19 embodiment.

DESCRIPTION OF THE PREFERRED EMBODIMENTS

The present invention circumvents the disadvantages of the prior art by making coarse acquisition independent of the clock timing (hence there is no need to wait for the clock to acquire) and also quicker by allowing the swept acquisition signal to run at a much faster rate. After coarse acquisition is complete, the clock timing signal is acquired, after which the decision directed carrier phase recovery is activated to complete the acquisition process.

Figure 5A:
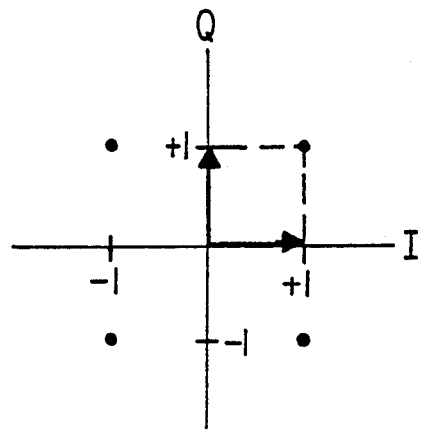
FIGS. 5A and 5B are signal constellations illustrating phase error effects.
Figure 5B:
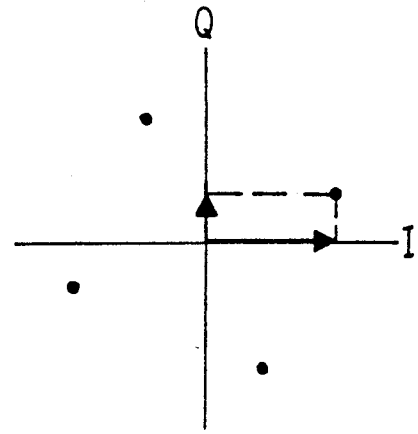

The QPSK constellation (see FIGS. 5A and 5B) is used for explanatory purposes due to its simplicity; however, the same concepts apply to higher order QAM modulation formats. In FIG. 5A the signal constellation is square with respect to the I and Q axes. It can be seen that simultaneous projection of each point of the constellation onto the I and Q axes produces a length that is the same. For example, as shown in FIG. 5A the point in the upper right hand corner projects to the point (0,1) on the Q axis and to the point (0,1) on the I axis. This indicates that this square/upright constellation produces the same amount of energy in both the I and Q channels. FIG. 5B shows a constellation that is tilted to the right. Here the same point now projects farther along the I axis than on the Q axis, indicating that the energy is not evenly distributed within the two channels. The same result applies to any point in the constellation, that is, the energy in the I and Q channels (on a sample-by-sample basis) differs due to a phase error between the locally generated carrier and the received carrier.

Figure 6:
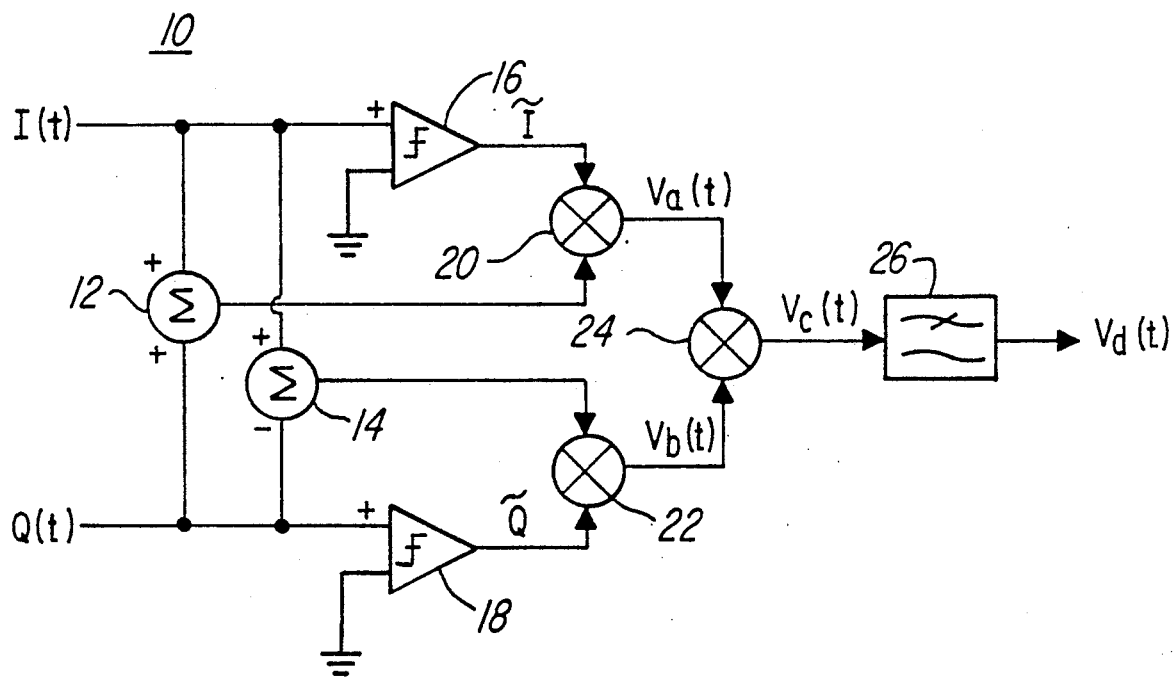
FIG. 6 illustrates an energy directed phase detector constructed according to the teachings of the present invention.

As is known to those skilled in the art, FIGS. 5A and 5B represent the results for a sampled system, but the same system applies to non-sampled eye patterns. That is, if a phase error exists then the signal energy in the pre-sampled I channel and Q channels differ per baud interval. FIG. 6 illustrates the "analog" version of this principle.

FIG. 6 shows one possible implementation of the energy directed portion of the present invention. However, there is a preferred implementation that will be discussed below. Let the modulated signal be represented by:

$$S(t) = A(t)\cos(\omega_0 t) + B(t)\sin(\omega_0 t).$$

In addition, let the signals A(t) and B(t) have the following statistical relationships:

$$E\{A(t)2\} = E\{B(t)2\} = Ka$$
$$E\{A(t)2 * B(t)2\} = E\{A(t)2\} * E\{B(t)2\}$$
$$E\{A(t) * B(t)\} = E\{B(t) * A(t)\} = 0.$$
where $E\{\ \}$ represents the expectation
(which is normally just the time average)

These restrictions are not severe and in fact represent the vast majority of QPSK data communications links.

Now let the demodulation process have a static phase error X such that the baseband signal can be represented by:

$$I(t) = A(t)\cos X - B(t)\sin(X) \quad \text{Eq. 1}$$

$$Q(t) = B(t)\cos X + A(t)\sin(X) \quad \text{Eq. 2}$$

For the sake of brevity, let this modulation represent QPSK. This assumption is not a fundamental restriction, but rather just makes the mathematics easier. The use of QPSK implies that the value of A(t) or B(t) at the sample time is either +E or −E.

From FIG. 6 it can be seen that a decision is going to be made as to whether the voltage on the I and Q channels is less than or greater than zero. On FIG. 6 this voltage is indicated as $\tilde{I}$ and $\tilde{Q}$. Now it can be seen from Equations 1 and 2 above that for X=0 (no phase error):

$$\tilde{I} = A(T) \text{ and } \tilde{Q} = B(T) \text{ (for X=0 and for any time t=T)}$$

In fact, it can be readily shown that for $|X| < 45$ degrees, $\tilde{I} = A(T)$ and $\tilde{Q} = B(T)$. With this established, the circuit voltage values shown in FIG. 6 can be derived as follows:

$$V_a(t) = A(t)^2 \cdot \cos(X) - A(t)B(t)\sin(X) + A(t)B(t)\cos(X) + A(t)^2 \cdot \sin(X)$$

$$V_b(t) = A(t)B(t)\cos(X) - B(t)^2 \cdot \sin(X) - B(t)^2 1 \cdot \cos(X) - A(t)B(t)\sin(X)$$

$$V_c(t) = V_a(t)V_b(t).$$

Low pass filtering the voltage $V_c(t)$ (taking the expectation) yields the final result:

$$V_d(t) = E\{V_c\} = -4K_aK_b\sin(X)\cos(X) = -2K_aK_b\sin(2X) \qquad \text{Eq. 3}$$

Figure 7:
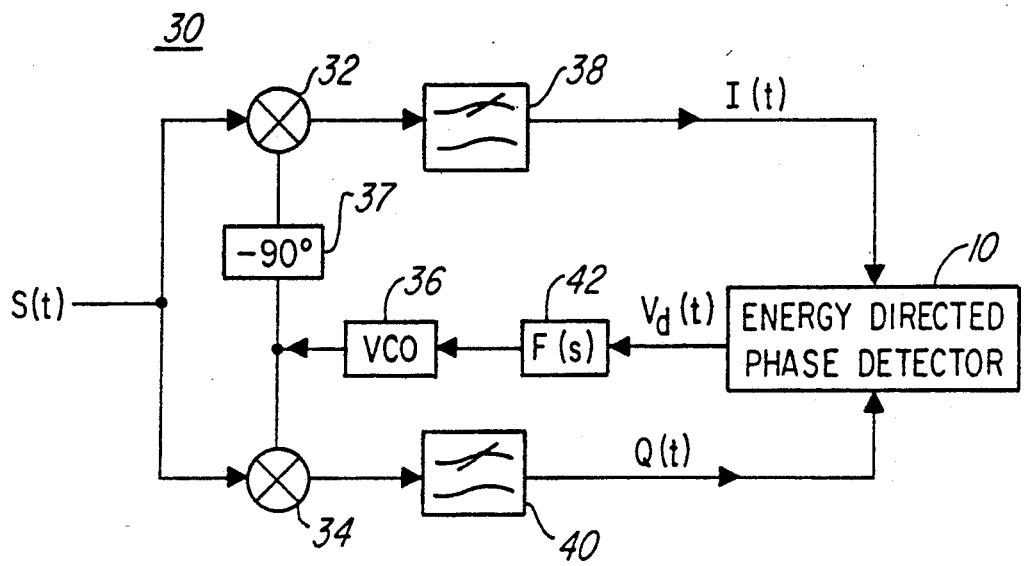
FIG. 7 illustrates a energy directed phase locked loop including the energy directed phase detector of FIG. 6.

This is the signal that is the output of the energy directed coarse acquisition phase detector in FIG. 6 and is input through the loop filter (as shown in FIG. 7) and finally becomes the controlling voltage for the demodulator oscillator to be discussed below.

The energy directed phase detector 10 in FIG. 6 includes a summer 12 receiving signals I(t) and Q(t). A summer 14 receives input signals I(t) and −Q(t). The signal I(t) is input to one input terminal of a comparator 16, and the other input terminal thereof is connected to ground. Similarly, the signal Q(t) is input to a first input terminal of a comparator 18 and the other input terminal is connected to ground. The output signal from the comparator 16, labeled $\tilde{I}$, is combined in a multiplier 20 with the output from the summer 12. Similarly, the output signal $\tilde{Q}$ from the comparator 18 is combined in the multiplier 22 with the output from the summer 14. The resultant signal from the multiplier 20 ($V_a(t)$) and the output signal from the multiplier 22 ($V_b(t)$) are input to a multiplier 24 producing an output signal $V_c(t)$, which is input to a low-pass filter 26. The output signal from the energy directed phase detector is available at the output terminal of the low-pass filter 26 and is labeled $V_d(t)$.

FIG. 7 illustrates the complete energy directed phase detector phase locked loop 30 including the energy directed phase detector 10 from FIG. 6. The input signal S(t), as defined by the equation above, is input to multipliers 32 and 34. The output signal from a voltage-controlled oscillator 36 (VCO) is input to the multiplier 32 via a 90 degree phase shifter 37 and input directly to the multiplier 34. The output signal from the multiplier 32 is input to a filter 38, and the output signal from the multiplier 34 is input to a filter 40. The output signals from both the filters 38 and 40 are input to the energy directed phase detector 10. That is, the output signal from filter 38 is designated I(t) and the output signal from the filter 40 is designated Q(t). The output signal $V_d(t)$ from the energy directed phase detector 10 is input to a loop filter 42 in FIG. 7. The output signal from the loop filter 42 is input to the VCO 36, thus closing the phase locked loop.

It can be seen that Equation 3 above has the same form as the error voltage derived from a classic Costas loop. It is important to recognize that Equation 3 generates a voltage that is representative of the phase error X, specifically, the voltage $V_d(t) = 0$ when $X = 0$.

A preferred embodiment for the energy directed phase detector is illustrated in FIG. 8 and designated by reference character 50. The signal I(t) is input to the non-inverting input terminal of comparators 52 and 56. The inverting input terminal of the comparator 52 is connected to ground. The signal Q(t) is input to the non-inverting input terminal of a comparator 58 and to the inverting input terminal of the comparator 56. The signals I(t) and Q(t) are summed at a terminal 60, via resistors 62 and 64, respectively. The common terminal 60 is connected to the non-inverting terminal of a comparator 54. The inverting input terminal thereof is connected to ground. The output terminal of the comparator 52 is connected to a first input terminal of an exclusive OR gate 62. The output terminal from the comparator 54 is connected to the second input terminal of the exclusive OR gate 62. The output terminals from the comparators 56 and 58 are connected respectively to first and second input terminals of an exclusive OR gate 64. The output terminals from the exclusive OR gates 62 and 64 are connected to first and second input terminals, respectively, of an exclusive OR gate 66. The output signal from the exclusive OR gate 66 is input to a loop filter 6B that is similar to the filter 26 illustrated in FIG. 6. The output signal from the loop filter 68 is $V_d(t)$, similar to the output signal bearing the same designation in FIG. 6.

In this embodiment the output signal $V_d(t)$ is given by:

$$V_d(t) = E\{[sgn(I)XOR\ sgn(I+Q)]\ XOR\ [sgn(Q)XOR\ sgn(I-Q)]\} \qquad \text{Eq. 4}$$

Notice that $V_d(t)$ is the output of digital logic, and it takes on one of two logic levels.

Figure 9A:
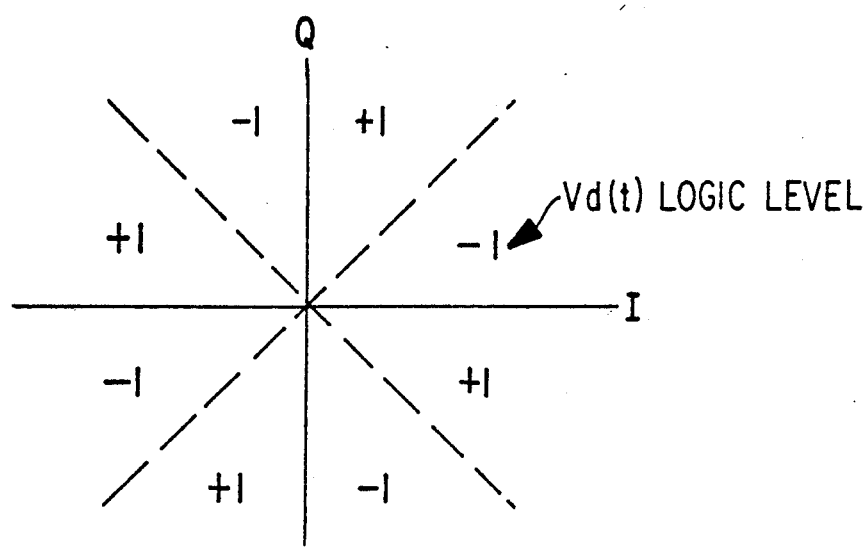
FIGS. 9A and 9B are vector diagrams for use in conjunction with the energy directed phase detector of FIG. 8.
Figure 9B:
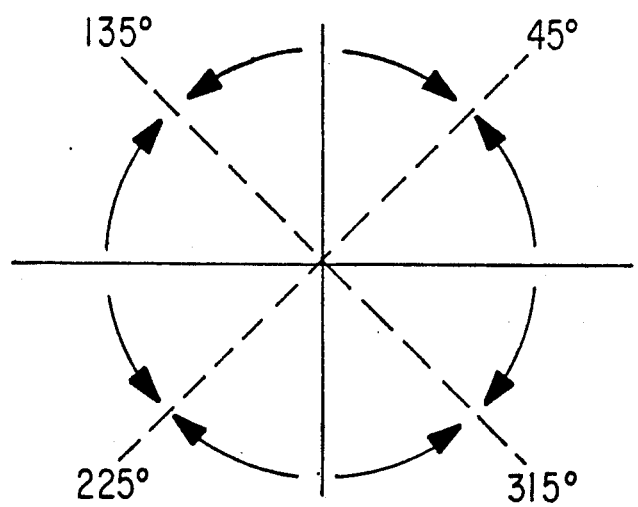

The results from Equation 4 above are plotted in FIGS. 9A and 9B on a cartesian coordinate system. For various values of I and Q input signals, the logic level (assuming bipolar logic) for the output signal $V_d(t)$ is shown in FIG. 9A.

Figure 1A:
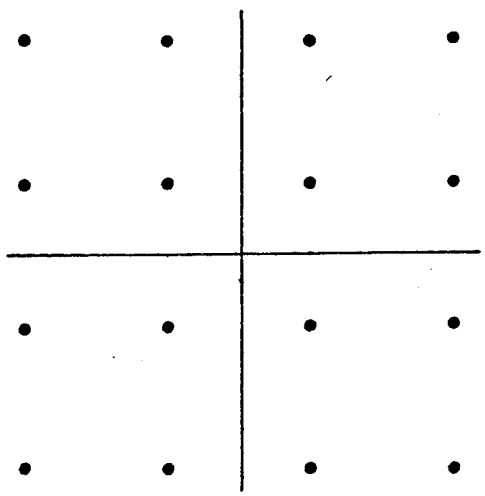
Figure 1B:
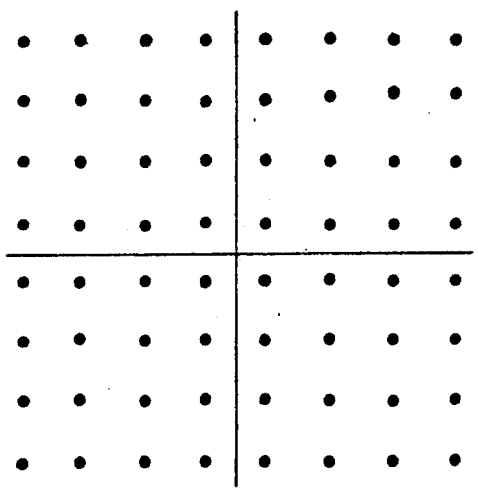
Figure 1C:
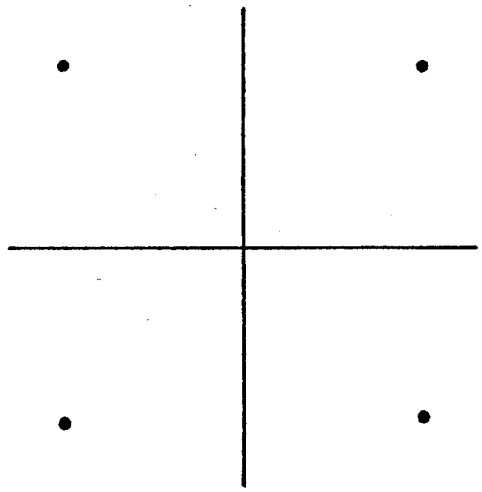
Figure 3:
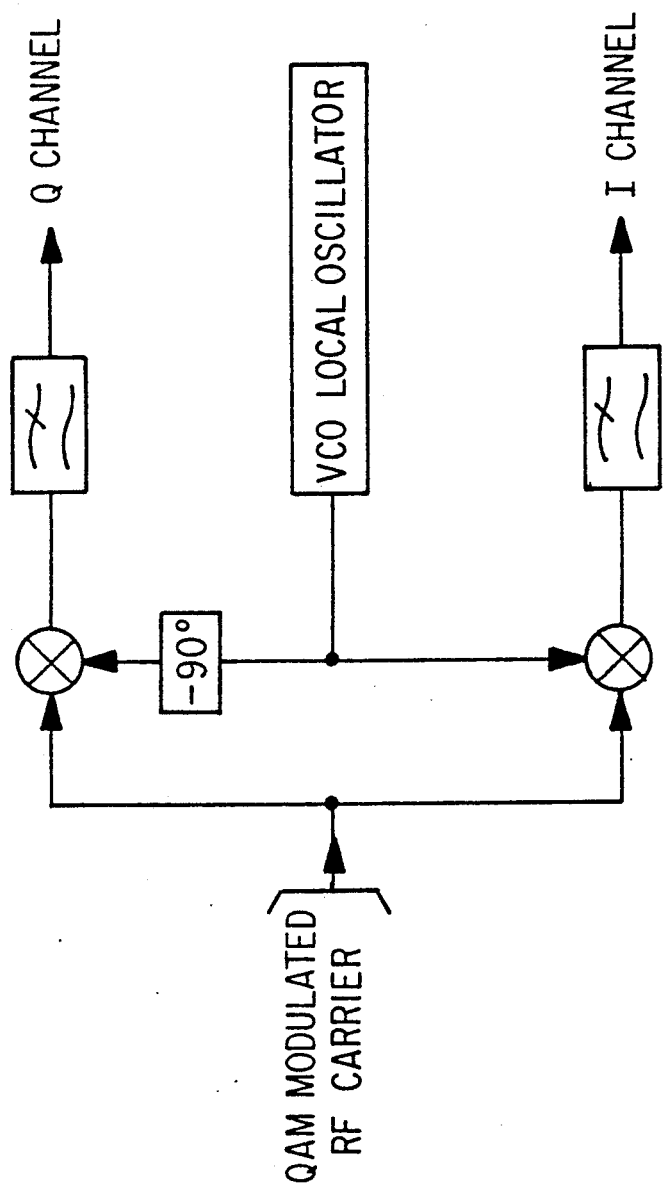
FIG. 3 is an illustration of a prior art technique for QAM demodulation.
Figure 4A:
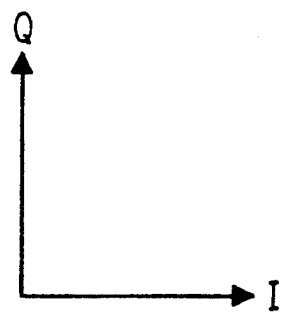
FIG. 4A through 4E illustrate the vector diagrams and constellations for QAM demodulation.
Figure 4B:
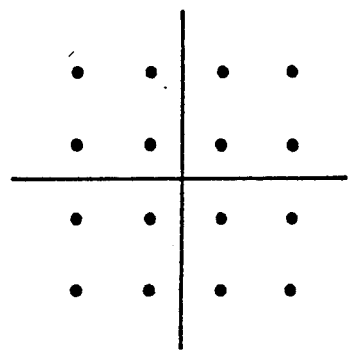
Figure 4C:
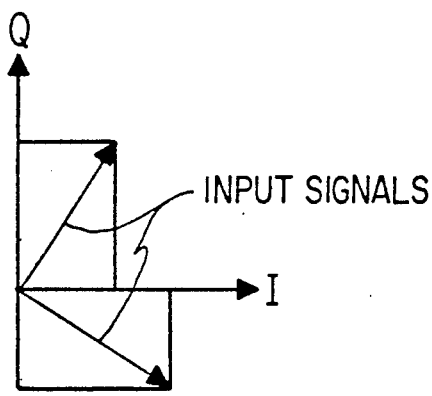
Figure 4D:
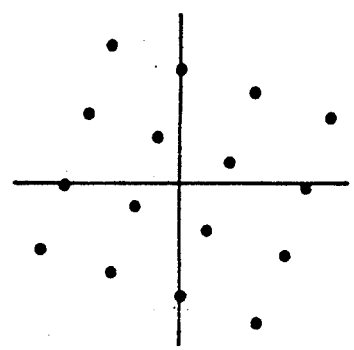
Figure 4E:
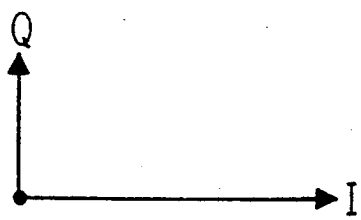

If a +1 is defined as a clockwise rotation (or torque on the loop) and a −1 as a counterclockwise rotation then it can be seen from FIG. 9B that the only equilibrium points are those that lie along one of the four diagonal vectors at angles of 45, 135, 225, and 315 degrees. Thus the QPSK constellation is forced to reside as shown in FIG. 1C, and this is by definition a phase locked condition.

The principle derived for QPSK signals above can be extrapolated to 16, 64, and higher QAM formats with reference to FIGS. 10A (QPSK), 10B (16 QAM), and FIG. 10C (64 QAM). Each of these modulation formats are shown with their average center indicated. This average is consistent with the previously stated assumption that:

$$E\{A(t)^2\} = E\{B(t)^2\} = K_a.$$

It is the average value for these higher formats that will be forced to align with one of the four 45 degree vectors. Thus each channel can be represented by an average value and this average value is proportional to the energy in that channel. The implication is that even though the qualitative analysis for this coarse acquisition phase detector was accomplished using a QPSK signal, the same principles hold for higher The decision directed aspect of the present invention involves modulation format.

Figure 2A:
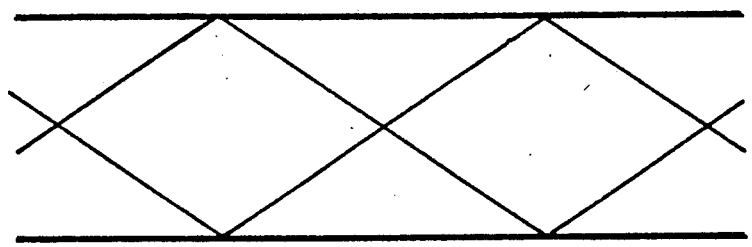
Figure 2B:
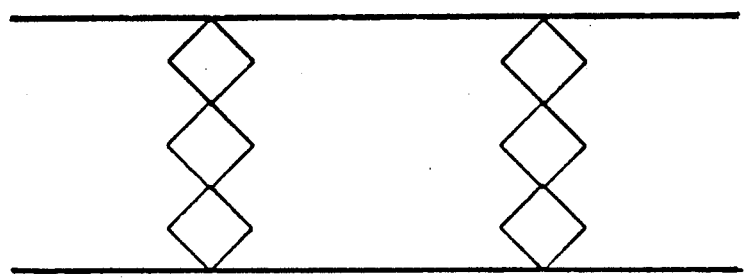
Figure 2C:
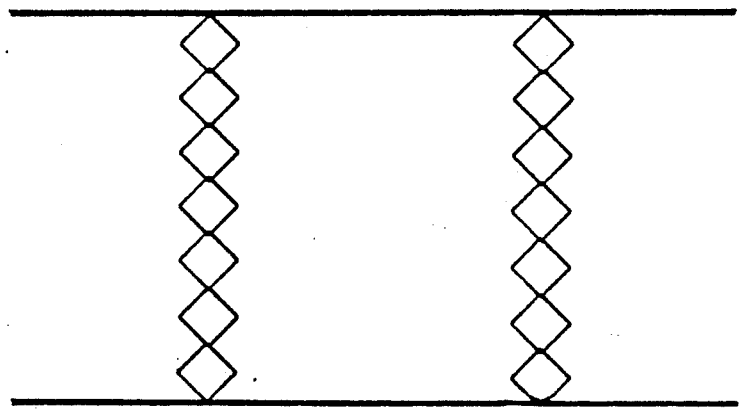

The decision directed aspect of the present invention involves the use of a decision directed phase detector to make fine adjustments in the phase of the demodulator oscillator. The adjustments made by the second phase detector are much more accurate than those made by the first phase detector (FIG. 8) because more information is used to make these fine adjustments, namely the clock timing. Thus, only information about the signal at the clock sampling instant is used, corresponding to sampling the signal at the peak of the eye pattern (see FIG. 2) when the signal power is at a maximum. Thus, one would expect these results to be more accurate.

FIG. 11 illustrates the operation of the sampling and decision process used in the decision directed phase detector. The input to an analog-to-digital converter (ADC) 70 is the analog eye pattern illustrated in FIG. 12 and represents a discrete voltage. Recall that the eye pattern is simply a superposition of many segments of the analog waveform. Thus at the analog-to-digital converter's sample epoch a unique voltage exists at the input to the analog-to-digital converter 70 and this voltage is quantized via the analog-to-digital converter 70 in the usual manner. The number of bits required by the analog-to-digital converter is determined by the type of QAM modulation and is given by the equation below:

$$BITS = (LOG_2 \sqrt{M}) + 1$$

where $M$ = 4 for QPSK
16 for 16 QAM
64 for 64 QAM etc.

The extra bit is used to form the error bit. This error bit provides information on how close to a desired voltage level the analog waveform passed at the precise instant that it was sampled with the clock signal.

The amplitude of the input waveform, and hence the eye pattern, is controlled so that the eye pattern is superimposed upon the quantization levels of the analog-to-digital converter as shown in FIG. 13. In FIG. 13 16 QAM is used for explanation purposes, although those skilled in the art will recognize that it is extendable to other QAM formats. Bits D2 and D1 can be decoded to form the hard decisions on the waveform, while bit D0 provides information on whether the sampled voltage was slightly above or slightly below the desired voltage value with respect to the analog-to-digital quantization levels.

FIG. 14 illustrates a decision directed phase detector 80 constructed according to the teachings of the present invention and incorporating the analog-to-digital conversion concepts of FIG. 11. The decision directed phase detector 80 is similar to the energy directed phase detector 50 (see FIG. 8), the primary difference being that the signal level is sampled at the clock edge in the decision directed phase detector 80. The sampling process produces a sampled estimate of the signal and an error signal to be explained below. QPSK modulation will be used for explanation purposes and then the results extrapolated to higher modulation formats.

FIG. 15A shows a distorted eye pattern. As can be observed, the error information is caused by the signal voltage being slightly off in value at the sample time. The cause of this phenomenon is illustrated in FIGS. 16A, 16B, and 16C. The problem is created because a small portion of the signal from one channel bleeds into the opposite channel. FIG. 16A shows I and Q analog inputs to a summer 82. FIG. 16B illustrates the eye pattern for either one of these I or Q analog signals. An attenuator 84 is inserted into the Q path to the summer 82 to lower the magnitude of the Q analog signal. In this way the FIG. 16A circuit causes some portion of the Q signal to bleed into the I signal in the form of the summing operation performed by the summer 82. The resultant I analog signal is distorted, with the eye pattern illustrated in FIG. 16C. The bleed over causes the diamond illustrated in FIG. 16B to be flattened out as shown in FIG. 16C. There is also some fuzziness created by the bleed over.

FIG. 17 is a vector diagram representation of the bleed over effects modeled in FIG. 16A. In the FIG. 17 representation there is no intersymbol interference, hence the error signal is due entirely to carrier phase error; however, the same principle would apply even in the presence of intersymbol interference. The objective is to detect the presence of the interference signal and adjust the carrier phase to remove it.

Mathematically, this can be accomplished by correlating the error information in one channel with hard decision information from the other channel. This process is attempting to answer the question: Is there any relationship between the error signal in one channel and data pattern in the other channel. This process is performed by the decision directed phase detector 80 shown in FIG. 14 and based upon the model of FIG. 16A can be expressed as:

$$V_{corr} = E\{I(t)*Q_{err}(t)\} = E\{I(t)*R*I(t)\} = R*E\{I(t)^2\} \quad \text{Eq. 5}$$

Now let $R = \sin(x)$ where X is the phase error and also make use of the statistical relationships that were previously derived. Then Equation 5 can be rewritten as $$V_{corr} = K_d * \sin(X)$$

and thus $V_{corr}$ can be forced to zero by forcing X to zero. The actual implementation as shown in FIG. 14 uses only sign information and is suitable for implementation with digital hardware. This approach works because it can be shown that:

$$IF\ E\{A(t)*B(t)\} = 0\ THEN\ E\{sgn[A(t)*B(t)]\} = 0$$

$$AND\ ALSO\ E\{sgn[A(t)]*sgn[B(t)]\} = 0.$$

The output signal from the decision directed phase detector 80 is then given by an equation that is very similar to the equation used to describe the energy directed phase detector 50.

$$V_d(t) = E\{([sgn[I(t)]XOR\ sgn[Q_{err}(t)])XOR([sgn[Q(t)]XOR\ sgn[I_{err}(t)])\} \quad \text{Eq. 6}$$

The first term in this equation produces an inverted logic level. The reason for this can be seen from FIG. 18 where the $\bar{Q}$, $\bar{I}$, $Q_{err}$ and $I_{err}$ signals are shown. The $I_{err}$ signal is the projection of $\bar{Q}$ onto the $\bar{I}$ axis and $Q_{err}$ is the projection of $\bar{I}$ onto the $\bar{Q}$ axes. The latter projection yields a negative value. Correlation (XOR) of the appropriate signals (assuming bipolar logic) yields:

$$sgn(Q_{err}).XOR.sgn(\bar{I}(t)) = -1$$

$$sgn(I_{err}).XOR.sgn(\bar{Q}(t)) = +1$$

Since the same phase error produced these two signals, the results of the separate correlations should be the same; therefore, inversion of one of the products allows derivation of a suitable error signal after the two signals have been XORed together as shown in FIG. 14.

Returning now to FIG. 14 there was shown the decision directed phase detector 80. The signal I(t) is input to an analog-to-digital converter 88 and the signal Q(t) is input to an analog-to-digital converter 90. The clock signal is also input to both of the analog-to-digital converters 88 and 90. FIGS. 11 and 13 illustrate the operation of the analog-to-digital converters 88 and 90. As can be seen in FIG. 14, all the bits from the $\bar{I}$ channel make up the signal referred to as $\bar{I}$, with the exception of the error bit, which is input to an exclusive OR gate 92.

Likewise, the output signals from the analog-to-digital converter 90 form the $\bar{Q}$ signal, again with the exception of the error signal, designated $Q_e$. The $Q_e$ error signal is input to an exclusive OR gate 94. The most significant bit of the I channel from the analog-to-digital converter 88 is input to the exclusive OR gate 94. Similarly, the most significant bit from the $\bar{Q}$ channel is input to the exclusive OR gate 92. The output terminals from the exclusive OR gates 92 and 94 are connected, respectively, to first and second input terminals of an exclusive OR gate 96. The output signal from the exclusive OR gate 96 is designated $V_d(t)$ and is given by Equation 6 above.

The complete invention combining the energy directed phase detector 50 and the decision directed phase detector 80 is illustrated in FIG. 19. The actual summing of the output signals from the two phase detectors occurs in filter 100 and specifically within resistors 102 and 104. The output signal from the energy directed phase detector 50 (coarse detection) is immediately applied to filter 100. The output of the decision directed phase detector 80 (fine) is applied to a filter 106 prior to being summed into the filter 100 via the resistor 104. Switch 108 is connected to a clock recovery lock detector 110. The switch 108 disconnects the decision directed phase detector 80 prior to data clock recovery to prevent erroneous information from the decision directed phase detector 80 from interfering with the coarse acquisition process.

Each of the filters 100 and 106 has a time constant associated with it that is determined by the values of the resistors 102, 104, 114, 118, and 120 and capacitors 112 and 116. This time constant is important in establishing the loop bandwidth and determines how quickly the phase locked loop responds to the error signals. In the preferred embodiment the value of the resistor 118 is approximately 10 times the value of the resistor 114. The result is that filter 106 is much more sluggish (slower to respond) than filter 100 by approximately a factor of 10.

Completing the discussion of FIG. 19 it can be seen that the intermediate frequency input is applied to multipliers 130 and 132. A voltage-controlled oscillator (VCO) 134 produces an oscillating signal that is input to a phase shifter 136. The unshifted output signal from the phase shifter 136 is input to the multiplier 130, while the quadrature signal from the phase shifter 136 is input to the multiplier 132. As discussed previously, the phase and frequency of this oscillating signal from the voltage controlled oscillator 34 is controlled by the energy directed phase detector 50 and the decision directed phase detector BO as discussed above. The output signals from the multipliers 130 and 132 are input to low-pass filters 138 and 140 respectively. The low-pass filters 138 and 140 filter the unwanted double-frequency terms produced by the multiplication process, providing the I and Q analog signals that are input to both the energy directed phase detector 50 and the decision directed phase detector 80.

It is important to consider how quickly each of the phase detectors 50 and 80 can influence the voltage controlled oscillator 134. The output of the energy directed phase detector 50 feeds directly to the filter 100, while the output from the decision directed phase detector 80 first passes through filter 106 before entering filter 100. Thus the energy directed phase detector 50 has the predominant control over the voltage controlled oscillator 134, while the decision directed phase detector 80 has a secondary effect. Stated differently, the bandwidth of the energy directed portion of the loop is much wider than the bandwidth of the decision directed portion of the loop by approximately a factor of 10.

To better understand the operation of the combination loop 101 shown in FIG. 19 it is first important to understand the response of a simple phase locked loop to a dc voltage as shown in FIG. 20. In that figure a phase locked loop 150 includes a phase detector 152 responsive to a reference voltage. The phase detector 152 represents any of the well-known types of phase detectors, including the energy directed phase detector 50. The output from the phase detector 152 is input to a summer 154. Also input to the summer 154 is a variable dc voltage designated $V_{off}$. The output from the summer is input to a filter 156, typically a lag-lead type filter with a transfer function of $F(s)$. The output from the filter 156 is input to a voltage controlled oscillator 158. The output therefrom closes the loop by connection to the second input terminal of the phase detector 152. It can be assumed that the loop filter is a second order loop (that is, it contains a perfect pole). This assumption makes the explanation easier but is not a requirement for the operation of the loop.

Assume that $V_{off}$ is equal to zero volts. The phase detector compares the phases of the input reference signal ($V_{ref}$) and the output signal from the VCO 158, and generates a dc output error signal that is proportional to the phase difference between the two input signals. This error signal is then passed through the summer 154 where it is unaltered because $V_{off}$ is equal to zero and then passed to the loop filter 156. The loop filter 156 acts as a voltage integrator with a continually slewing output as long as the dc input voltage to the filter is not zero. In a properly working phase locked loop the output of the filter 156 slews in a proper direction to change the phase of the voltage controlled oscillator 158 such that the output of the phase detector goes to zero. This, in turn, causes the input signal to the filter 156 to become zero and then the output reaches a steady state (no further slewing) and the loop achieves equilibrium. The important feature is to notice that the input signal to the filter 156 must become zero for equilibrium or lock to occur.

Now assume that $V_{off}$ does not equal zero but instead assumes a small but finite value. For the loop to become locked, the output of the summer 154 must be zero, but since $V_{off}$ is not zero, this implies that the output signal from the phase detector 152 must assume a value equal to $-V_{off}$ so that it will cancel the applied offset voltage and equilibrium will occur. However, this in turn implies that for the output of the phase detector 152 to be a constant non-zero value, a static phase error must occur between the $V_{ref}$ input signal and the output signal from the VCO 158. This static phase error is responsive to the value of $V_{off}$. Thus, by controlling the value of $V_{off}$, it is possible to shift the phase of the voltage controlled oscillator 158.

This principle is used to adjust the phase of the VCO 158 after the energy directed acquisition has occurred and the decision directed error correction takes place. The phase detector 152 in FIG. 20 is replaced by the energy directed phase detector, and the dc offset signal provided by $V_{off}$ represents the output signal from the decision directed phase detector.

Turning back to FIG. 19, the output signal from the decision directed phase detector 80 is applied to filter 106, which is usually a lead lag type filter that forms an integrator. With this type of a filter, as long as the dc input is not zero, the output slews. For a properly connected loop the direction of slew is the direction necessary to drive the filter input signal towards zero.

Referring to FIG. 19, the following events occur during the acquisition process. When the QAM signal to be demodulated is first applied, the energy directed phase detector 50 produces an error signal that slews the VCO 134 in the correct direction to achieve lock. At this time the switch 108 is open. The slewing process continues until the output error signal from the energy directed phase detector 50 is substantially zero. At that point the coarse acquisition is complete. Next, the clock recovery (not shown in FIG. 19) successfully recovers the data clock and indicates this by activating a data clock ready signal.

There are several well-known techniques for clock recovery. One classical implementation is illustrated in FIG. 21. This technique is described in the paper by L. E. Franks and J. P. Bubrouski, entitled "Statistical Properties of Timing Jitter in a PAM Timing Recovery Scheme", IEEE Transactions on Communications, volume COM-22, July 74. After passing through a data filter 180 the data is first band limited via a symmetrical band pass filter 182, having a center frequency of R/2. R is the baud rate. The signal is then frequency doubled up to a frequency R (the clock frequency) in a frequency doubler 184. The frequency doubled signal is then passed through a band pass filter 186 having a center frequency at R. The typical way to align the clock and data when only the clock frequency is available is to shift the clock in such a manner that the clock edge is centered on the data eye pattern. As discussed above, the data eye pattern is simply the superposition of many segments of the analog data waveform, such as would be seen on an oscilliscope. The clock shifting is manually accomplished via any of the well-known phase shifting schemes, for instance, a variable length section of transmission line or an L-C phase shifting circuit. The phase shifter is identified in FIG. 21 by reference character 188. The phase shifted clock is then hard limited in a comparator 190 to square up the clock edges. The output signal from the hard limiter 190 is the recovered clock used in decoding the transmitted information. With respect to FIG. 19, the recovered clock frequency is input to the clock recovery lock detector 110.

When clock recovery lock has been indicated the switch 108 closes, permitting the decision directed phase detector 80 to perform the fine acquisition process. The output of the decision directed phase detector 80 produces a signal that slews the output of the filter 106 in a direction to reduce the phase error. The output signal from the filter 106 is injected as an offset voltage into the filter 100 (this is similar to the discussion above with respect to FIG. 20 and the dc offset signal referred to as $V_{off}$). Since the time constant of the filter 100 is much faster than that of the filter 106, filter 100 immediately adjusts the phase of the VCO 134 in response to this apparent offset voltage. The resulting adjustment of the output signal from the VCO 134 is felt by both the energy directed phase detector 50 and the decision directed phase detector 80, but the interpretation is different in each case.

In the case of the energy directed phase detector 50, an output error signal is generated that serves to counter the presence of the injected offset signal. In the case of the decision directed phase detector 80, this adjustment of the VCO 134 has the effect of driving the output signal therefrom towards zero. Because the loop bandwidths and time constants of the two loops are so different, an equilibrium condition is reached where the output of the decision directed phase detector 80 becomes zero at the same time that the input to the loop filter 100 also becomes zero. The output signal from the filter 100 then assumes a steady-state value, holding the VCO 134 output steady, thereby completing the acquisition process.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are obvious to one of ordinary skill in the art.

What is claimed is:

1. An apparatus for demodulating a carrier signal modulated by an information signal, comprising:
   oscillator means for providing an oscillating signal;
   multiplier means responsive to said oscillating signal and the carrier signal for producing first and second signals;
   first phase detector means responsive to said first and said second signals for producing a first error signal, wherein said first error signal represents the difference between the phase of the carrier signal and the phase of the oscillating signal;
   where said first error signal is input to said oscillator means for altering said oscillating signal until said first error signal becomes substantially zero.
   second phase detector means responsive to said first and said second signals for producing first and second baseband signals and for producing a second error signal;
   clock recovery means responsive to said first or said second baseband signals for recovering the clock signal therefrom after said first error signal is substantially zero and for producing a clock lock signal upon recovery of the clock signal;
   controllable switch means responsive to said clock lock signal, wherein in response to said clock lock signal said switch is closed; and
   wherein when said switch is closed, said first and second error signals are input to said oscillator means for altering said oscillating signal until said first and said second error signal become substantially zero and wherein the application of said second error signal to said oscillator means lags the application of said first error signal to set oscillator means.

2. The apparatus of claim 1 including a first filter having a time constant of T, wherein the first error signal is input to said first filter for producing a first filtered error signal;
   and including a second filter having a time constant of approximately 10 T, wherein the second error signal is input to said second filter for producing a second filtered error signal; and
   wherein said first and said second filters are serially connected with the controllable switch means disposed therebetween such that the second filtered error signal passes through the controllable switch means, when the controllable switch means is in the closed position, and then the second filtered error signal passes into said first filter, and wherein the different filter time constants account for the lagging of the second error signal and wherein said first and said second filtered error signals are input to the oscillator means.

3. The apparatus of claim 1 wherein the carrier signal is modulated by the information signal using QPSK modulation.

4. The apparatus of claim 1 wherein the carrier signal is modulated by the information signal using 16 QAM modulation.

5. The pparatus of claim 1 wherein the carrier signal is modulated by the information signal using 64 QAM modulation.

6. The apparatus of claim 1 wherein the carrier signal includes an in-phase and a quadra-phase component and is modulated by the information signal in such a way that there is approximately equal power in said in-phase and said quadra-phase channels.

7. The apparatus of claim 1 wherein the multiplier means includes first and second multipliers each responsive to the carrier signal;

and including phase shifter means responsive to the oscillating signal for producing an in-phase signal and a quadrature-phase signal;

and wherein said first multiplier is also responsive to said in-phase signal for producing a first product signal; wherein said second multiplier is also responsive to said quadrature-phase signal for producing a second product signal;

further including a first filter means responsive to said first product signal for producing the first analog signal;

and further including a second filter means responsive to said second product signal for producing the second analog signal.

8. The apparatus of claim 1 wherein the first phase detector includes;

a first terminal responsive to the first analog signal;
a second terminal responsive to the second analog signal;
first and second resistors serially connected between said first and said second terminals, wherein said first and said second resistors are joined at a common terminal;
a first comparator having a non-inverting input terminal connected to said first terminal, and having an inverting input terminal connected to ground;
a second comparator having a non-inverting input terminal connected to said common terminal, and having an inverting input terminal connected to ground;
a third comparator having a non-inverting input terminal connected to said first terminal and having an inverting input terminal connected to said second terminal;
a fourth comparator having a non-inverting input terminal connected to said second terminal and having an inverting input terminal connected to ground;

a first exclusive OR gate having a first input terminal connected to the output terminal of said first comparator and having a second input terminal connected to the output terminal of said second comparator;
a second exclusive OR gate having a first input terminal connected to the output terminal of said third comparator and having a second input terminal connected to the output terminal of said fourth comparator;
a third exclusive OR gate having a first input terminal connected to the output terminal of said first exclusive OR gate and having a second input terminal connected to the output terminal of said second exclusive OR gate;
wherein the output signal from said third exclusive OR gate is the first error signal.

9. The apparatus of claim 1 wherein the second phase detector includes;

a first analog-to-digital converter having an input terminal responsive to the first signal, and having a plurality of output terminals, wherein the signal at each output terminal can be in one of two states, and wherein the combination of the signals on the plurality of output terminals is a digital representation of the first signal input thereto, and wherein one of the output terminals is referred to as the most significant bit output terminal, and wherein another of the output terminals is referred to as the least significant bit output terminal;
a second analog-to-digital converter having an input terminal responsive to the second signal, and having a plurality of output terminals, wherein the signal at each output terminal can be in one of two states, and wherein the combination of the signals on the plurality of output terminals is a digital representation of the second signal input thereto, and wherein one of the output terminals is referred to as the most significant bit output terminal, and wherein another of the output terminals is referred to as the least significant bit output terminal;
a first exclusive OR gate having a first input terminal connected to the most significant bit output terminal of said first analog-to-digital converter, and having a second input terminal connected to the least significant bit output terminal of said second analog-to-digital converter;
a second exclusive OR gate having a first input terminal connected to the least significant bit output terminal of said first analog-to-digital converter, and having a second input terminal connected to the most significant bit output terminal of said second analog-to-digital converter;
a third exclusive OR gate having a first input terminal connected to the output terminal of said first exclusive OR gate, and having a second input terminal connected to the output terminal of said second exclusive OR gate;
wherein the signal on the output terminal of said third exclusive OR gate is the second error signal.

* * * * *